US012776344B2

(12) United States Patent
Ceylan Aksit et al.

(10) Patent No.: US 12,776,344 B2
(45) Date of Patent: Oct. 27, 2026

(54) VIDEO EDITING USING IMAGE DIFFUSION

(71) Applicant: Adobe Inc., San Jose, CA (US)

(72) Inventors: Duygu Ceylan Aksit, London (GB); Niloy Mitra, London (GB); Chun-Hao Huang, London (GB)

(73) Assignee: Adobe Inc., San Jose, CA (US)

( * ) Notice: Subject to any disclaimer, the term of this patent is extended or adjusted under 35 U.S.C. 154(b) by 362 days.

(21) Appl. No.: 18/479,626

(22) Filed: Oct. 2, 2023

(65) Prior Publication Data

US 2025/0111866 A1 Apr. 3, 2025

(51) Int. Cl.
*G11B 27/031* (2006.01)
*G06T 7/50* (2017.01)

(52) U.S. Cl.
CPC .............. *G11B 27/031* (2013.01); *G06T 7/50* (2017.01); *G06T 2207/10016* (2013.01)

(58) Field of Classification Search
CPC ................................ G11B 27/031; G06T 7/50
See application file for complete search history.

(56) References Cited

U.S. PATENT DOCUMENTS

2024/0169479 A1* 5/2024 Wang .................... G06T 3/4053
2024/0193412 A1* 6/2024 Bai ........................ G06N 3/047
2024/0256958 A1* 8/2024 Horvitz .................. G06N 20/00
2024/0355017 A1* 10/2024 Elyahu Zada .......... G06T 11/60
2024/0362842 A1* 10/2024 Ravi ........................ G06T 5/70
2025/0036678 A1* 1/2025 Chakrabarty ........... G06F 40/40
2025/0054167 A1* 2/2025 McIntosh ................. G06T 7/55

OTHER PUBLICATIONS

Balaji et al., "eDiff-I: Text-to-Image Diffusion Models with an Ensemble of Expert Denoisers", Mar. 14, 2023, pp. 1-24.
Choi et al., "ILVR: Conditioning Method for Denoising Diffusion Probabilistic Models", In International Conference on Computer Vision (ICCV), Oct. 2021, 14 pages.
Croitoru et al., "Diffusion Models in Vision: A Survey", IEEE Transactions on Pattern Analysis and Machine Intelligence, vol. 14, No. 8, Aug. 2022, pp. 1-25.
Dhariwal et al., "Diffusion Models Beat GANs on Image Synthesis", Conference on Neural Information Processing Systems (NeurIPS), vol. 34, Jun. 1, 2021, 44 pages.
Gafni et al., "Make-a-Scene: Scene-Based Text-to-Image Generation with Human Priors", arXiv:2203.13131v1, Mar. 24, 2022, pp. 1-17.
He et al., "Latent Video Diffusion Models for High-Fidelity Long Video Generation", arXiv:2211.13221v2, Mar. 20, 2023, 10 pages.

(Continued)

*Primary Examiner* — Mishawn N. Hunter
(74) *Attorney, Agent, or Firm* — Nicholson De Vos Webster & Elliott LLP

(57) ABSTRACT

Embodiments are disclosed for editing video using image diffusion. The method may include receiving an input video depicting a target and a prompt including an edit to be made to the target. A keyframe associated with the input video is then identified. The keyframe is edited, using a generative neural network, based on the prompt to generate an edited keyframe. A subsequent frame of the input video is edited using the generative neural network, based on the prompt, features of the edited keyframe, and features of an intervening frame to generate an edited output video.

20 Claims, 11 Drawing Sheets

(56) References Cited

OTHER PUBLICATIONS

Hertz et al., “Prompt-to-Prompt Image Editing with Cross Attention Control”, In International Conference on Learning Representations (ICLR), Aug. 2, 2022, 19 pages.
Ho et al., “Denoising Diffusion Probabilistic Models”, In Conference on Neural Information Processing Systems (NeurlPS), vol. 33, Dec. 16, 2020, 25 pages.
Hugging Face, “Stable Diffusion v2 Model Card”, available online at <https://huggingface.co/stabilityai/stable-diffusion-2>, 2024, 10 pages.
Jamriška et al., “Stylizing Video by Example”, ACM Trans. Graph., vol. 38, No. 4, Article 107, Jul. 2019, 11 pages.
Karras et al., “Elucidating the Design Space of Diffusion-Based Generative Models”, In Conference on Neural Information Processing Systems (NeurIPS), Oct. 11, 2022, pp. 1-47.
Kawar et al., “Imagic: Text-Based Real Image Editing with Diffusion Models”, arXiv:2210.09276v3, Mar. 20, 2023, 16 pages.
Kwon et al., “Diffusion Models Already Have a Semantic Latent Space”, In International Conference on Learning Representations (ICLR), Mar. 29, 2023, pp. 1-35.
Li et al., “BLIP: Bootstrapping Language-Image Pre-training for Unified Vision-Language Understanding and Generation”, arXiv:2201.12086v2, Feb. 15, 2022, 12 pages.
Meng et al., “Sdedit: Guided Image Synthesis and Editing With Stochastic Differential Equations”, In International Conference on Learning Representations (ICLR), Jan. 5, 2022, 33 pages.
Mokady et al., “Null-text Inversion for Editing Real Images using Guided Diffusion Models”, arXiv:2211.09794v1, Nov. 17, 2022, pp. 1-20.
Molad et al., “Dreamix: Video Diffusion Models are General Video Editors”, arXiv:2302.01329v1, Feb. 2, 2023, pp. 1-18.
Qiu et al., “StyleFaceV: Face Video Generation via Decomposing and Recomposing Pretrained StyleGAN3”, arXiv:2208.07862v1, Aug. 16, 2022, 9 pages.
Singer et al., “Make-a-Video: Text-to-Video Generation Without Text-Video Data”, In International Conference on Learning Representations (ICLR), Sep. 29, 2022, 13 pages.
Song et al., “Denoising Diffusion Implicit Models”, ICLR, 2021, pp. 1-22.
Tal et al., “Text2LIVE: Text-Driven Layered Image and Video Editing”, European Conference on Computer Vision (ECCV), Springer, 2022, 21 pages.
Tumanyan et al., “Plug- and-Play Diffusion Features for Text-Driven Image-to-Image Translation”, arXiv:2211.12572v1, Nov. 22, 2022, pp. 1-15.
Voynov et al., “Sketch-Guided Text-to-Image Diffusion Models”, arXiv:2211.13752v1, Nov. 24, 2022, pp. 1-15.
Wu et al., “Tune-a-Video: One-Shot Tuning of Image Diffusion Models for Text-to-Video Generation”, arXiv:2212.11565v2, Mar. 17, 2023, pp. 1-16.
Xu et al., “Temporally Consistent Semantic Video Editing”, arXiv:2206.10590, 2022, 19 pages.
Yu et al., “Video Probabilistic Diffusion Models in Projected Latent Space”, In Computer Vision and Pattern Recognition (CVPR), Mar. 30, 2023, 15 pages.
Zhang et al., “Adding Conditional Control to Text-to-Image Diffusion Models”, arXiv:2302.05543v3, Nov. 26, 2023, 12 pages.

* cited by examiner

Input $\mathcal{I} = \{I_1, \ldots I_n\}$, text prompt $\mathcal{P}'$, $T = 50$ diffusion steps, a pretrained diffusion model SD

Output $\mathcal{I}' = \{I'_1, \ldots I'_n\}$ $\mathcal{X}^T \leftarrow \{x_T^1, ..., x_T^n\}$ by DDIM inversion $\mathcal{I}' = \emptyset, \mathcal{F}^{anchor} = \emptyset, \mathcal{F}^{prev} = \emptyset, \hat{\mathcal{X}}_0^{prev} = \emptyset$ for f $\in [1, n]$: do

$\hat{\mathcal{X}}_0^{tmp} = [], \hat{\mathcal{F}}^{tmp} = []$ $x_t = x_T^f$ $\delta_{t-1} = 100$ if $t - 1 < 25$ else $\delta_{t-1} = 0$ for t $\in [1, T]$: do if $f = 1$ then

$f^{anchor} = \emptyset, f^{prev} = \emptyset, \hat{x}_0^{prev} = \emptyset$ else

$f^{anchor} = \mathcal{F}^{anchor}[t]$ $f^{prev} = \mathcal{F}^{prev}[t]$ $\hat{x}_0^{prev} = \hat{\mathcal{X}}_0^{prev}[t]$ end if

$x_{t-1}, \hat{x}_0^t, f^t = SD(x_t, t, \mathcal{P}, f^{anchor}, f^{prev})$ if $f = 1$ then

$\mathcal{F}^{anchor} \leftarrow \mathcal{F}^{anchor} \cup \{f^t\}$ else

$x_{t-1} \leftarrow x_{t-1} - \delta_{t-1} \nabla_{x_t} \|\hat{x}_0^{prev} - \hat{x}_0^t\|_2^2$ end if

$\mathcal{F}^{tmp} \leftarrow \mathcal{F}^{tmp} \cup \{f^t\}$ $\hat{\mathcal{X}}_0^{tmp} \leftarrow \hat{\mathcal{X}}_0^{tmp} \cup \{\hat{x}_0^t\}$ end for

$\hat{\mathcal{X}}_0^{prev} = \hat{\mathcal{X}}_0^{tmp}$ $\mathcal{F}^{prev} = \mathcal{F}^{tmp}$ $\mathcal{I}' \leftarrow \mathcal{I}' \cup \{I'_f\}$ end for

*FIG. 3*

VIDEO EDITING USING IMAGE DIFFUSION

BACKGROUND

Image diffusion models, trained on massive image collections, have emerged as a versatile image generator model in terms of quality and diversity. They support inverting real images and conditional (e.g., text) generation, making them attractive for high-quality image editing applications.

SUMMARY

Introduced here are techniques/technologies that enable video editing using an image diffusion model. Embodiments enable editing of a video using a pre-trained image diffusion model and a prompt (e.g., text-based editing instruction) without any additional training or scene/video-based fine-tuning. In some embodiments, the input video clip is inverted and edited based on a textual prompt received from a user or other entity. In particular, a keyframe (e.g., the first frame of the video, or a first frame of the video depicting a specific target object) is edited based on the prompt received from the user by an image diffusion model. These edits are then propagated consistently across the rest of the video. This consistency reduces or eliminates flickering and other artifacts during playback.

In some embodiments, edits are propagated through the video using attention layer manipulation, specifically in the self-attention layers of the image diffusion model, along with a latent update at each diffusion step. Unlike single image-based editing work, however, embodiments utilize previous frames when performing these steps. Additionally, the editing of the keyframe can be performed with any such method that utilizes the same or similar underlying image generation model.

As a result, embodiments provide a training-free approach that utilizes pre-trained large scale image generation models for video editing. Embodiments do not require pre-processing and do not incur any additional overhead during inference stage. This ability to use an existing image generation model paves the way to bring exciting advancements in controlled image editing to videos.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which:

FIG. 3 illustrates example pseudocode of a guided latent update during video editing using image diffusion in accordance with one or more embodiments;

DETAILED DESCRIPTION

Figure 1:
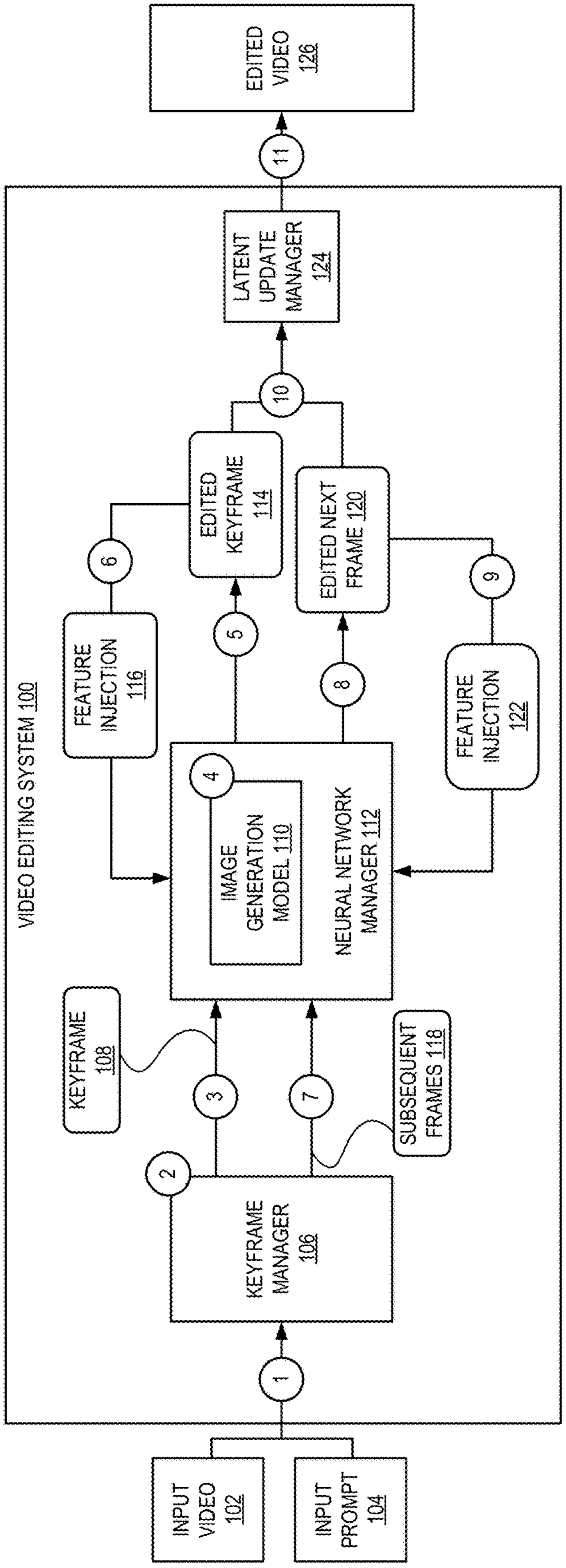
FIG. 1 illustrates a diagram of a process of video editing using image diffusion in accordance with one or more embodiments.

One or more embodiments of the present disclosure enable video editing using image diffusion. Diffusion-based techniques have emerged as the generative model of choice for image creation. They are stable to train (even over huge image collections), produce high-quality results, and support conditional sampling. Additionally, one can invert a given image into a pretrained diffusion model and subsequently edit using only textual guidance. While this is effective for generating individual images, attempts to apply such techniques to videos have proven challenging.

Diffusion models provide high quality output images when trained on large scale datasets. For example, Denoising Diffusion Probabilistic Model (DDPM) and its variant Denoising Diffusion Implicit Model (DDIM) have been widely used for unconditional text-to-image generation. Several large-scale text-to-image generation models, which operate on the pixel space have been presented, achieving very high-quality results. One prior example proposed to work in a latent space which lead to the widely adopted open source Stable Diffusion model.

In the presence of high-quality text conditioned image generation models, several recent works have focused on utilizing additional control signals for generation or editing existing images. For example, Palette has shown various image-to-image translation applications using a diffusion model including colorization, inpainting, and uncropping. Several methods have focused on providing additional control signals such as sketches, segmentation maps, lines, or depth maps by adapting a pretrained image generation model. These techniques work by either finetuning an existing model, introducing adapter layers or other trainable modules, or utilizing an ensemble of denoising networks. Other existing techniques have focused on editing images while preserving structures via attention layer manipulation, additional guidance optimization, or per-instance finetuning. However, such single image techniques require additional training/finetuning and yield poor quality results when they are applied to videos.

Until recently, generative adversarial networks (GANs) have been the method of choice for video generation, with many works designed towards unconditional generation. In terms of conditional generation, several methods have utilized guidance channels such as segmentation masks or keypoints. However, most of these methods are trained on specific domains. One particular domain where very powerful image generators such as StyleGAN exist is faces.

There have also been attempts to build on the success of text-to-image generation models, by creating text-to-video generation models using transformer-based or diffusion model-based architectures. However, such models are still in their infancy compared to images, both due to the complexity of temporal generation as well as a lack of large scale annotated video datasets. Other techniques have attempted to use a mix of image and video-based training to address the limited video training datasets. Still other techniques have attempted to finetune an image diffusion model on a specific input video to enable editing tasks. However, this requires additional training and is limited to a specific video (e.g., must be finetuned again for a new input video).

Another attempt at video editing has been made using layered neural representations. Layered neural atlases are such representations that map the foreground and background of a video to a canonical space. For example, Text2Live combines such a representation with text guidance to show video editing results. However, the computation of such neural representations includes extensive per-video training (7-10 hours), which limits their applicability in practice.

Finally, video stylization is a specific type of editing task where the style of an example frame is propagated to the video. While some methods utilize neural feature representations to perform this task, others consider a patch-based synthesis approach using optical flow. In one example, a per-video fast patch-based training setup is provided to replace traditional optical flow. Both methods achieve high quality results but are limited when the input video shows regions that are not visible in the provided style keyframes. They rely on having access to multiple stylized keyframes in such cases. However, generating consistent multiple keyframes itself is a challenge.

Accordingly, existing techniques have a number of drawbacks when applied to the video domain. For example, naively applying an image-based technique to each video frame produces inconsistent results. These inconsistencies are amplified during playback where they manifest as visual artifacts, such as flickering. Likewise, while it is possible to use a single frame for style guidance and employ video stylization propagation, the challenge lies in stylizing new content revealed under changing occlusions across frames. This may result when previously hidden details come into view (e.g., due to a change in camera angle, zoom, environmental motion, etc.). Others require extensive per-scene training or fine-tuning, which is costly in terms of computing resources used as well as impractical for real-world implementations.

To address these and other deficiencies in existing systems, the video editing system of the present disclosure enables editing of a video using a pre-trained image diffusion model and a prompt (e.g., text-based editing instruction) without any additional training. In some embodiments, the input video clip is inverted and edited based on a textual prompt received from a user or other entity. In particular, a keyframe (e.g., the first frame of the video, or a first frame of the video depicting a specific target object) is edited based on the prompt received from the user by an image diffusion model. These edits are then propagated consistently across the rest of the video. This consistency reduces or eliminates flickering and other artifacts during playback.

In some embodiments, edits are propagated through the video using attention layer manipulation, specifically in the self-attention layers of the image diffusion model, along with a latent update at each diffusion step. Unlike single image-based editing work, however, embodiments utilize previous frames when performing these steps. Additionally, the editing of the keyframe can be performed with any such method that utilizes the same or similar underlying image generation model.

As a result, embodiments provide a training free approach that utilizes pre-trained large scale image generation models for video editing. Embodiments do not require pre-processing and do not incur any additional overhead during inference stage. This ability to use an existing image generation model paves the way to bring exciting advancements in controlled image editing to videos.

FIG. 1 illustrates a diagram of a process of video editing using image diffusion in accordance with one or more embodiments. As shown in FIG. 1, a video editing system 100 can enable video editing using an image generation model, such as Stable Diffusion, or other image diffusion-based model(s). The video editing system 100 may be implemented as a standalone system, such as an application executing on a client computing device, server computing device, or other computing device. In some embodiments, the video editing system may be implemented as a tool incorporated into another system, service, application, etc. to provide image diffusion-based video editing. The video editing system 100 may be implemented in a user device, in a service provider device as part of a cloud computing model, or other device which may receive input videos and return output videos.

In some embodiments, a user may provide an input video 102 and an input prompt 104 to the video editing system 100, as shown at numeral 1. Although embodiments are described as receiving inputs from and returning outputs to a user, in various embodiments the inputs may be received from another system or other entity (such as an intervening system between the end user and the video editing system). The input video 102 may be a digital video comprising a plurality of frames (e.g., digital images). The digital video may be a raw video file or may be encoded using a suitable codec. The input prompt may be a text string which describes an edit to be made to the video. For example, the video may depict various objects, locations, etc. and the prompt may identify one or more of these "targets" and describe a visual edit to be made. Such edits may include changing color or texture, may include adding, removing, or replacing a target, or other visual changes to be made to the video.

In some embodiments, the video editing operation may be initiated through interaction via a user interface, such as a graphical user interface (GUI) with a tool icon representing the video editing operation. The user, or other entity, may then be presented with options for selecting the video 102 to be edited and a field in which to enter the prompt 104. The user may select any input video 102 accessible to the video editing system, such as locally stored video files, or videos accessible over one or more networks, such as a local area network (LAN), the Internet, etc. The video may then be obtained from the video source location indicated by the user (e.g., uploaded by the user, downloaded from a remote location by the video editing system, etc.).

Once the video has been obtained, the keyframe manager 106 may identify a keyframe at numeral 2. In some embodiments, the keyframe may be the first frame of the video. Alternatively, the keyframe may be a first frame of the video that depicts content. For example, the first several frames of the video may be blank (e.g., a solid color). Similarly, in some embodiments, the keyframe may be selected to be the first frame of the video that includes the target identified in the input prompt 104 to be edited. Once the keyframe 108 has been identified, it is provided to image generation model 110 at numeral 3. Image generation model 110 may be a neural network that has been trained to generate or edit images based on text descriptions. As discussed, a popular type of image generation model for such applications are diffusion models, such as Stable Diffusion. In some embodiments, the image generation model 110 is the Stable Diffusion depth conditioned model. However, in various embodiments, other image generation models may be used.

As discussed, image generation model 110 may be implemented as a neural network. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data. In various embodiments, the image generation model 110 may execute in a neural network manager 112. The neural network manager 112 may include an execution environment for the image generation model, providing any needed libraries, hardware resources, software resources, etc. for the image generation model.

The image generation model 110 receives the keyframe 108 and the input prompt 104 and outputs an edited keyframe 114 at numeral 5. The edited keyframe 114 includes one or more edits (e.g., changes) that have been made to the keyframe that have altered its appearance. These changes may then be used when editing subsequent frames of the input video 102. For example, as discussed further below, feature injection 116 of features from processing the keyframe may be used when processing subsequent frames 118. For example, after keyframe 108 has been processed, at numeral 7 subsequent frames 118 are then provided to the image generation model 110. These frames may be provided one at a time or in batches, depending on implementation. Each subsequent frame is processed by the image generation model 110 with features from previously processed images injected into some layers of the image generation model 110. For example, the next frame (e.g., keyframe+1) may be processed with features from the keyframe. This results in edited next frame 120, as shown at numeral 8. This processing may continue until all frames of the input video have been processed. In some embodiments, subsequent frames may be processed using features of the keyframe and one or more other preceding frames being injected, as shown at numeral 9. For example, the following frame (e.g., keyframe+2) may be processed with features from the keyframe and the previous frame (e.g., keyframe+1), then keyframe+3 may be processed with features from the keyframe and keyframe+2, and so on. As discussed further below, by injecting features of preceding frames into the image generation model, appearance consistency across frames is improved.

At numeral 10, the edited keyframe 114 and edited next frame(s) 120 are provided to latent update manager 124. In some embodiments, the edited frames may be provided one at a time, as they are generated, to the latent update manager 124. Alternatively, in some embodiments, the edited frames are all provided together when all edited frames have been generated. In some embodiments, smaller batches of edited frames may be provided to the latent update manager 124. The feature injection discussed above can improve the consistency of the appearance of the edits across frames, the latent update manager 124 is responsible for improving temporal consistency across frames. Temporal inconsistencies result in flickering or other artifacts during playback of the edited video. As discussed further below, the latent update manager 124 provides guidance to update the latent variable during each diffusion step, similar to classifier guidance. Once each edited frame has been processed by the latent update manager 124, they are reassembled into edited video 126, at numeral 11. Edited video 126 has had its appearance edited based on the input prompt 104 without requiring any per-scene training by the image generation model and also maintains appearance and temporal consistency.

In some embodiments, for longer videos or videos with multiple distinct scenes, multiple keyframes may be identified. In such instances, once a new keyframe is reached, then processing repeats for that second keyframe similarly to the processing of the first keyframe described above. Likewise, the subsequent frames from that second keyframe are processed similarly to the subsequent frames following the first keyframe. As such, each video is divided into portions, separated by keyframes, and each portion is separately processed.

Figure 2:
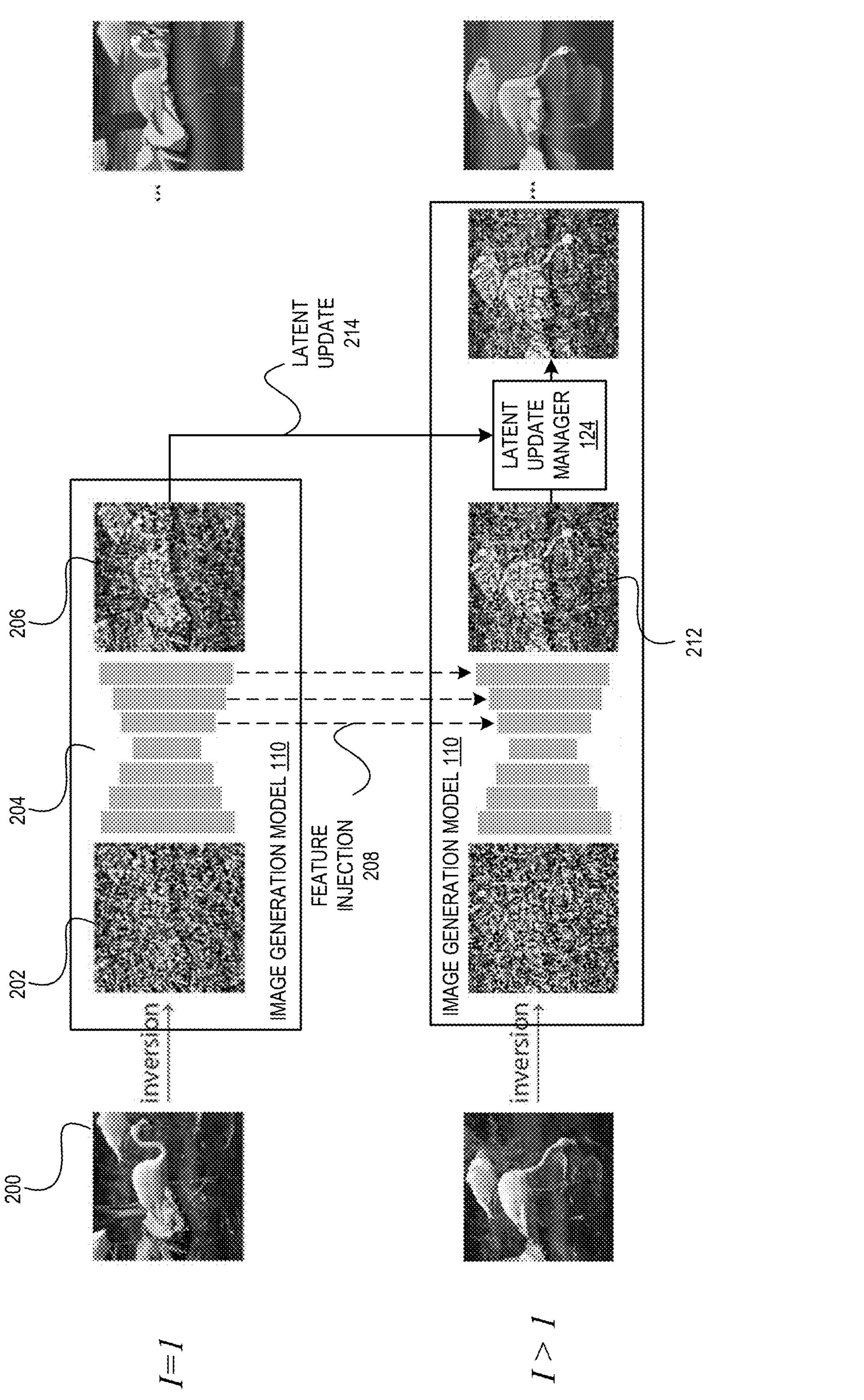
FIG. 2 illustrates an example pipeline for video editing using image diffusion in accordance with one or more embodiments.

FIG. 2 illustrates an example pipeline for video editing using image diffusion in accordance with one or more embodiments. As discussed, a video is edited by first identifying a keyframe 200. Given a sequence of frames of a video clip, $I:=\{I_1, \ldots, I_n\}$, the video editing system generates a new set of images $$I' := \{I'_1, \ldots, I'_n\}$$

that reflects an edit denoted by an input text prompt P'. For example, given a video of a car, the user may want to generate an edited video where attributes of the car, such as its color, are edited. Embodiments use the power of a pretrained and fixed large-scale image diffusion model (e.g., image generation model 110) to perform such manipulations as coherently as possible, without the need for any example-specific finetuning or extensive training. As discussed, this is achieved by manipulating the internal features of the image diffusion model along with additional guidance constraints.

Given that the fixed image generation model is trained with only single images, it cannot reason about dynamics and geometric changes that happen in an input video. However, image generation models can be conditioned with various structure cues. Embodiments use this additional structure channel to provide additional information in capturing the motion dynamics. Accordingly, in some embodiments, the image generation model is a depth-conditioned image diffusion model (such as a depth-conditioned Stable Diffusion model). As such, for any given video frame I, the video editing system generates a depth prediction which may be utilized as additional input to the model.

The image generation model 110, like Stable Diffusion and other large scale image diffusion models, may be a denoising diffusion implicit model (DDIM) where each step is given a noisy sample and predicts a noise-free sample. As shown in FIG. 2, the image generation model 110 first inverts each frame with DDIM-inversion and considers it as the initial noise XT for the denoising process. In this example, initially the keyframe (e.g., I=1) is inverted as shown at 202. The image generation model includes a U-Net architecture 204 including an encoder and a decoder. The inverted keyframe is processed by the U-Net architecture 204 to produce latent 206.

As discussed, in the context of static images, a large-scale image generation diffusion model typically includes a U-Net architecture. The U-Net architecture includes residual, self-attention, and cross-attention blocks. While the cross-attention blocks are effective in terms of achieving faithfulness to the text prompt, the self-attention layers are effective in determining the overall structure and the appearance of the image. At each diffusion step t, the input features $$f_t^l$$

to the self-attention module at layer l, are projected into queries, keys, and values by matrices $W^Q$, $W^K$, and $W^V$, respectively to obtain queries $Q^l$, keys $K^l$, and values $V^l$. The output of the attention block is then computed as:

$$Q^l = W^Q f_t^l;\ K^l = W^k f_t^l;\ V^l = W^v f_t^l$$

$$\hat{f}_t^l = softmax\left(Q^l (K^l)^T\right)(V^l)$$

In other words, for each location in the current spatial feature map $$f_t^l,$$

a weighted summation of other spatial features is computed to capture global information. Extending to the context of videos, the interaction across the input image sequence is captured by manipulating the input features to the self-attention module. Specifically, the features obtained from the previous frames are injected as additional input features. A straightforward approach is to attend to the features $$f_t^{j,l}$$

of an earlier frame j while generating the features $$f_t^{i,l}$$

for frame i as, $$Q^{i,l} = W^Q f_t^{i,l};\ K^{i,l} = W^k f_t^{j,l};\ V^{i,l} = W^v f_t^{j,l}$$

With such feature injection, the current frame is able to utilize the context of the previous frames and hence preserve the appearance changes. In some embodiments, an explicit, potentially recurrent, module can be employed to fuse and represent the state of the previous frame features without explicitly attending to a specific frame. However, the design and training of such a module is not trivial. Instead, embodiments rely on the pre-trained image generation model to perform such fusion implicitly. For each frame i, the features obtained from frame i−1 are injected. Since the editing is performed in a frame-by-frame manner, the features of i−1 are computed by attending to frame i−2. Consequently, this provides an implicit way of aggregating the feature states.

While attending to the previous frame helps to preserve the appearance, in longer sequences (e.g., longer videos), the quality of the edit diminishes. Attending to an additional anchor frame avoids this forgetful behavior by providing a global constraint on the appearance. Hence, in each self-attention block, features from keyframe a and frame i−1 are combined (e.g., concatenated) to compute the key and value pairs. As discussed, in some embodiments the keyframe is the first frame of the video, a first frame to include a target object, a first frame of a new scene, etc.

To edit each frame I>1, a reference frame is selected, and its self-attention features are injected 208 to the U-Net. As discussed, this feature injection 208 results in a more consistent appearance across frames. At each diffusion step, the latent of the current frame, e.g., 212, is updated 214 based on the latent 206 of the reference frame. In some embodiments, both I−1 (the immediately previous frame) and I=1 (the keyframe) frames are used as reference for feature injection, while only the previous frame is used for the guided latent update.

$$Q^{i,l} = W^Q f_t^{i,l};$$

$$K^{i,l} = W^k\left[f_t^{a,l}, f_t^{i-1,l}\right];\ V^{i,l} = W^v\left[f_t^{a,l}, f_t^{i-1,l}\right]$$

As shown in FIG. 2, the above feature injection is performed in the decoder layers of the U-Net, which was found effective in maintaining appearance consistency. The deeper layers of the decoder capture high resolution and appearance-related information and already result in generated frames with similar appearance but small structural changes. Performing the feature injection in earlier layers of the decoder avoids such high frequency structural changes. Although features may also be injected in the encoder of the U-Net, no significant benefit was observed from such injections and some artifacts were observed.

Feature injection provides improved appearance consistency across frames. However, a consistent appearance is not necessarily temporally consistent (e.g., consistent across time). The frames of a video represent a time series, so any temporal inconsistencies will be visible to an observer as flickering or other visual artifacts. Temporal coherency requires preserving the appearance across neighboring frames while respecting motion dynamics of the scene. To improve temporal consistency, embodiments use guided diffusion to update the intermediate latent codes to enforce similarity to the previous frame before continuing the diffusion process. While the image generation model cannot reason about motion dynamics explicitly, recent work has shown that generation can be conditioned on static structural cues such as depth or segmentation maps. Being disentangled from the appearance, such structural cues provide a path to reason about the motion dynamics. Hence, embodiments utilize a depth-conditioned image generation model and use the predicted depth from each frame as additional input.

Stable Diffusion, like many other large-scale image diffusion models, is a denoising diffusion implicit model (DDIM) where at each diffusion step, given a noisy sample $x_t$, a prediction of the noise-free sample $\hat{x}_t$, along with a direction that points to $x_t$, is computed. Formally, the final prediction of $x_{t-1}$ is obtained by:

$$x_{t-1} = \sqrt{\alpha_{t-1}} \underbrace{\hat{x}_0^t}_{predicted\ x_0} + \underbrace{\sqrt{1-\alpha_{t-1}-\sigma_t^2}\epsilon_\theta(x_t, t)}_{direction\ pointing\ to\ x_t} + \underbrace{\sigma_t\epsilon_t}_{random\ noise},$$

$$\hat{x}_0^t = \frac{x_t - \sqrt{1-\alpha_t}\epsilon_\theta^t(x_t)}{\sqrt{\alpha_t}},$$

where $\alpha_t$ and $\sigma_t$ are the parameters of the scheduler and $\epsilon_\theta$ is the noise predicted by the U-Net at the current step t. The estimate $$\hat{x}_0^t$$

is computed as a function of $x_t$ and indicates the final generated image. Since the goal is to generate similar consecutive frames eventually, an L2 loss function is defined as $$g(\hat{x}_0^{i,t}, \hat{x}_0^{i-1,t}) = \|\hat{x}_0^{i,t} - \hat{x}_0^{i-1,t}\|_2^2$$

that compares the predicted clean images at each diffusion step t between frames i−1 and i. The current noise sample of a frame i at diffusion step $$t, x_{t-1}^i,$$

is updated along the direction that minimizes g:

$$x_{t-1}^i \leftarrow x_{t-1}^i - \delta_{t-1}\nabla_{x_t^i} g(\hat{x}_0^{t,i-1}, \hat{x}_0^{t,i})$$

where $\delta_{t-1}$ is a scalar that determines the step size of the update. In some embodiments, $\delta_{t-1}$ is set to 100, however other step sizes may be used. This update process is performed for the early denoising steps, namely the first 25 steps among the total number of 50 steps, as the overall structure of the generated image is already determined in the earlier diffusion steps. Performing the latent update in the remaining steps often results in lower-quality images.

Finally, the initial noise used to edit each frame also significantly affects the temporal coherency of the generated results. As discussed, some embodiments use an inversion mechanism, DDIM inversion, while other inversion methods aiming to preserve the editability of an image can be used as well. In some embodiments, to get a source prompt for inversion, a caption may be generated for the first frame of the video using a caption model. This process is expressed as pseudocode in FIG. 3.

Figure 4:
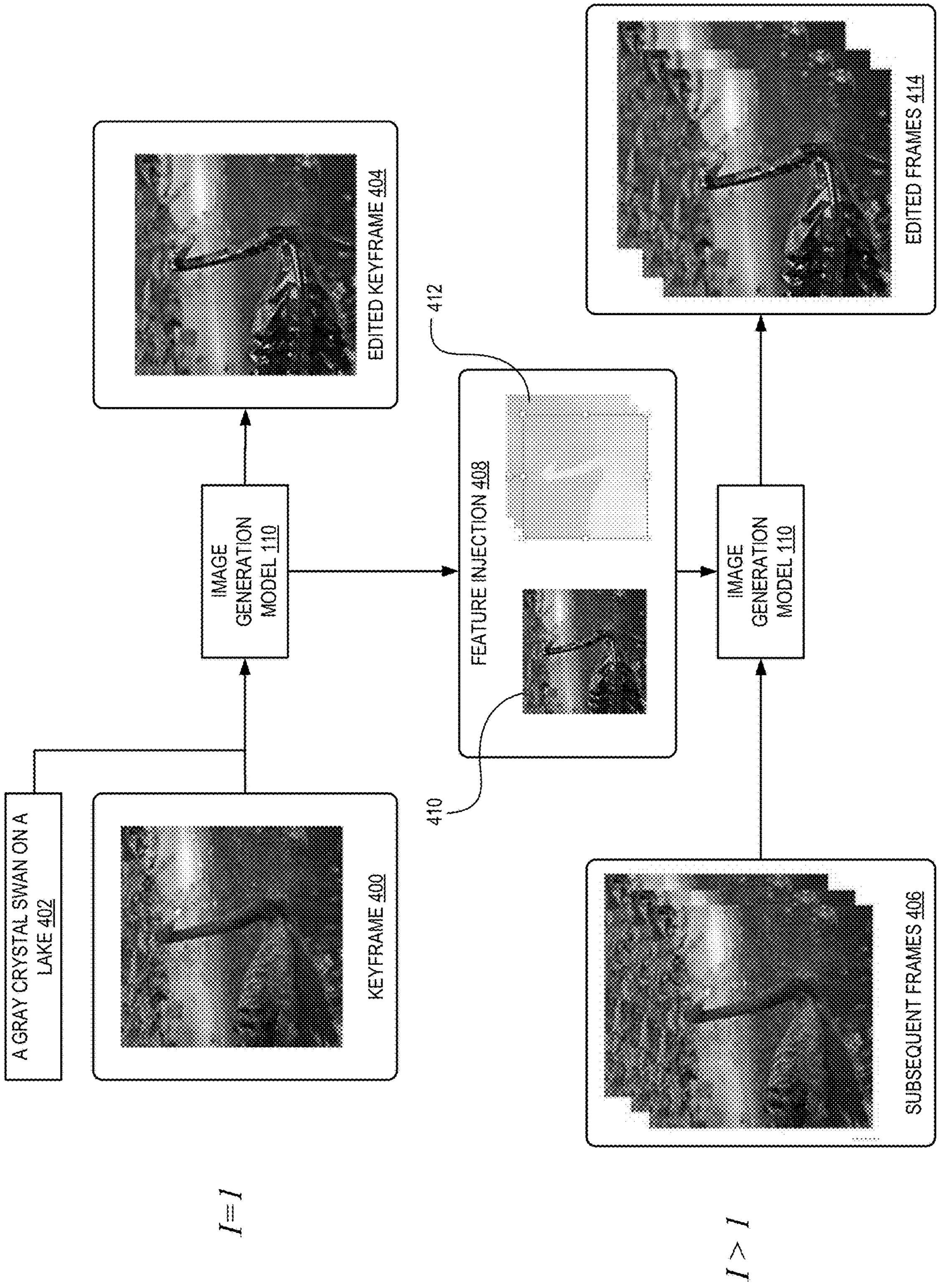
FIG. 4 illustrates an example of feature injection during video editing using image diffusion in accordance with one or more embodiments.

FIG. 4 illustrates an example of feature injection during video editing using image diffusion in accordance with one or more embodiments. FIG. 4 shows one example of editing an example video based on an example prompt. In this example, the video is of a black swan floating in water. The first frame (e.g., I=1) is identified as keyframe 400. Additionally, the input text prompt 402 is "a gray crystal swan on a lake". As shown, the keyframe 400 and the prompt 402 are provided to the image generation model 110. As discussed, the image generation model 110 performs the techniques described herein and generates an edited keyframe 404 in which the swan is now depicted as gray and crystalline.

As discussed, on subsequent frames 406 (e.g., at I>1), the features of the keyframe are injected into the decoder layers of the image generation model. As shown, these features may include the self-attention features (hear represented by the appearance of the edited keyframe 410) as well as structural features, such as depth map 412. The depth map 412 may be obtained by passing the keyframe through a depth model trained to estimate depth of an image. Alternatively, video frames may include a depth layer captured by the camera along with the video (e.g., a camera that also includes a depth finder, lidar sensor, etc.). Though not shown, the feature injection 408 may include the features of the keyframe 404 and the features of the immediately preceding frame (e.g., for I>2). This results in edited frames 414. The edited frames include an edited target object (e.g., the swan) which has been edited based on the input prompt 402.

Figure 5:
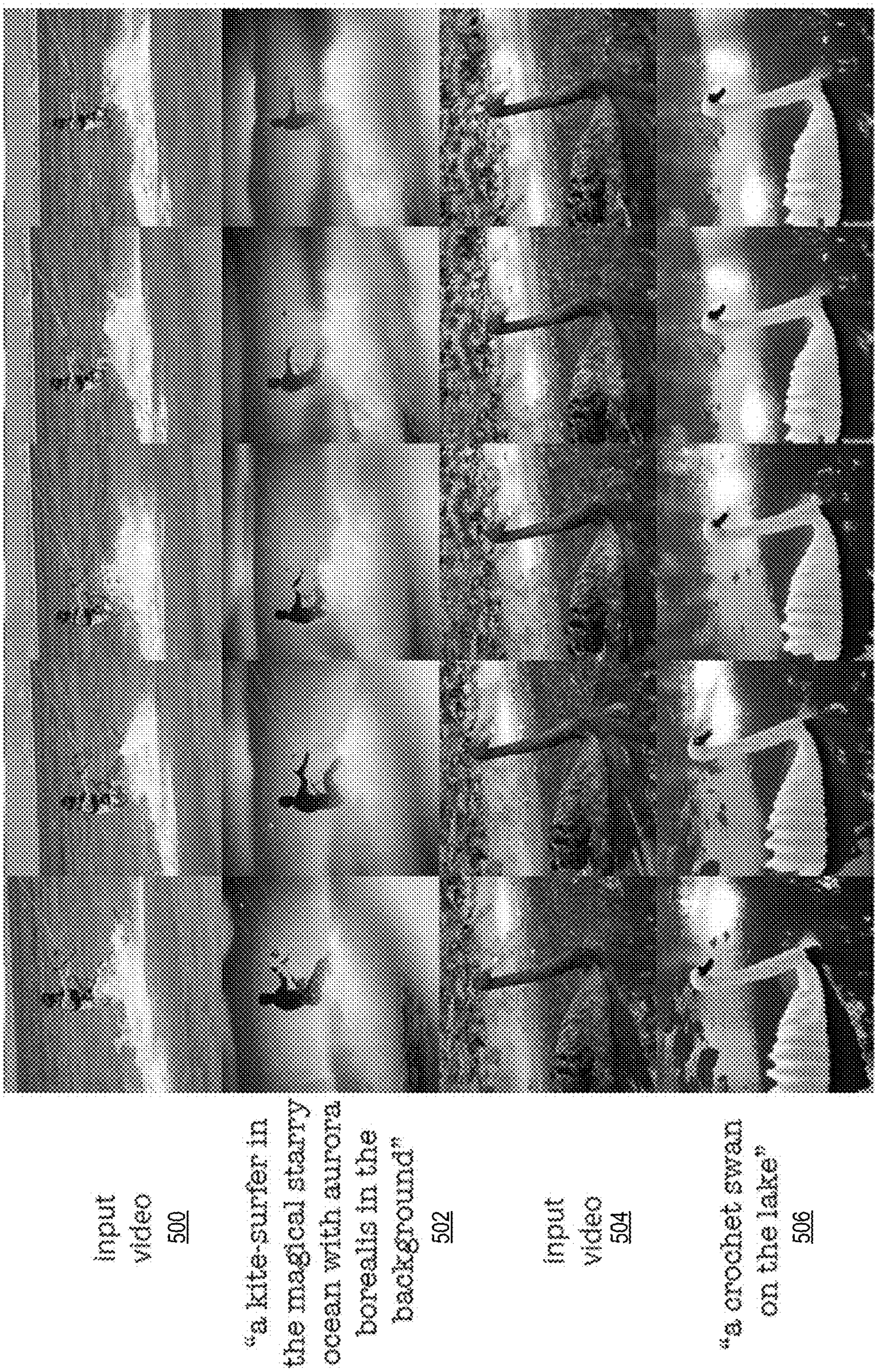
FIG. 5 illustrates example results of video editing using image diffusion in accordance with one or more embodiments.

FIG. 5 illustrates example results of video editing using image diffusion in accordance with one or more embodiments. FIG. 5 shows two examples of input videos that have been provided for editing. Input video frames 500 depict a kite surfer. The corresponding input prompt is "a kite-surfer in the magical starry ocean with aurora borealis in the background." After processing the input frames, output frames 502 have been edited to add the requested background, along with more stylized waves and a silhouetted subject. Likewise, input video frames 504 depict a black swan floating next to a shore. The corresponding input prompt is "a crochet swan on the lake." The resulting output frames 506 have been edited to remove the shoreline from the input video, replacing it with additional water surface and the target object (the swan) has had its appearance edited to appear to be crocheted.

Figure 6:
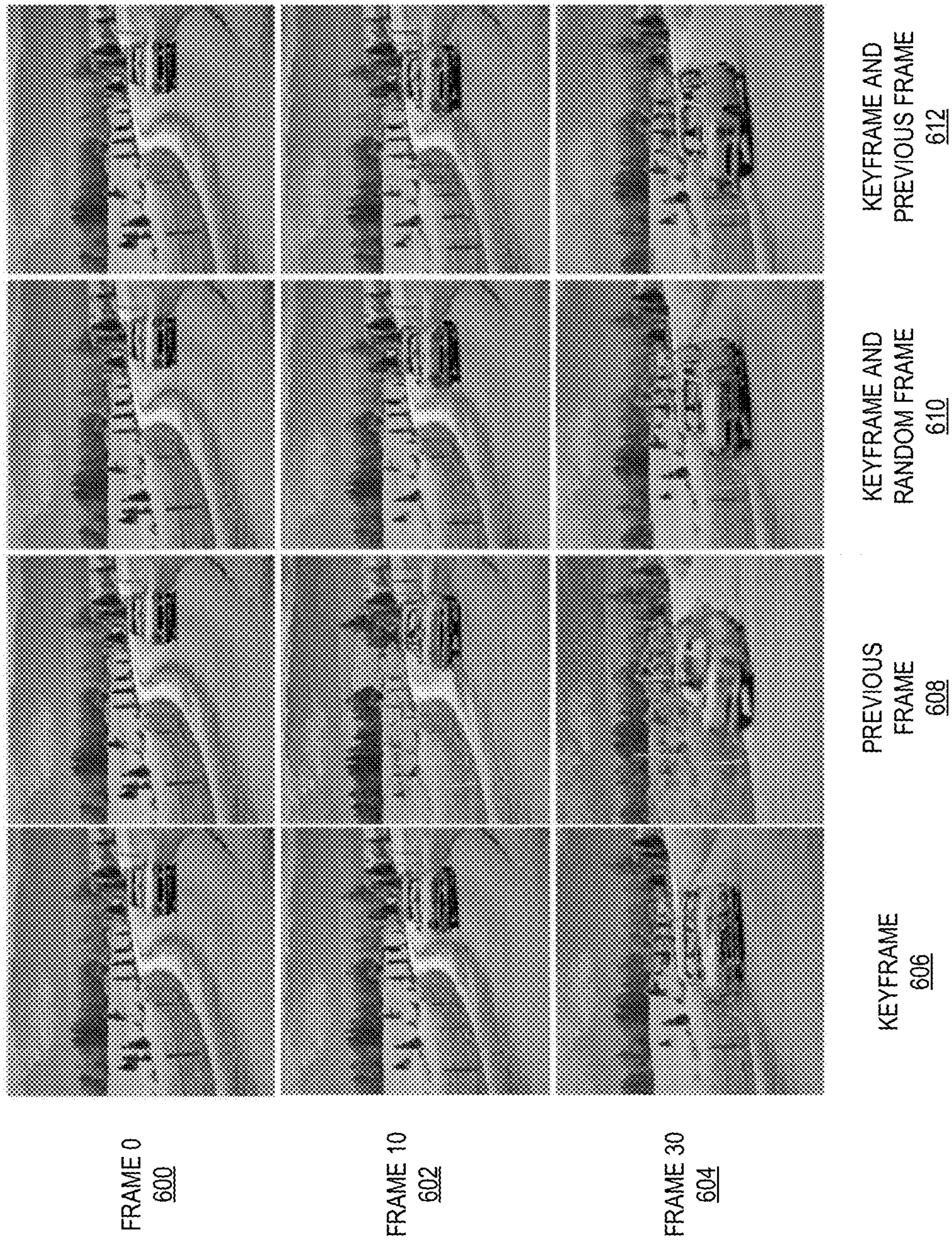
FIG. 6 illustrates a comparison of the results of different feature injections in video editing using image diffusion in accordance with one or more embodiments.

FIG. 6 illustrates a comparison of the results of different feature injections in video editing using image diffusion in accordance with one or more embodiments. Different choices were evaluated for the self-attention feature injection. Using a fixed keyframe results in structural artifacts as the distance between the keyframe and the edited frame increases. This is shown in FIG. 6 by comparing frame 0 600 to frame 10 602 and frame 30 604 of keyframe 606. Attending only to the previous frame or a randomly selected previous frame results in temporal and structural artifacts as shown in the previous frame column 608 and the keyframe and random frame column 610. The results with the fewest artifacts were obtained by using a fixed keyframe and the previous frame, as shown in column 612.

For example, where no previous frame information is used or a random previous frame is chosen, more artifacts are observed. These are especially prominent for sequences that depict more rotational motion, e.g., the structure of the car not being preserved as the car rotates. This confirms that attending to the previous frame implicitly represents the state of the edit in a recurrent manner. Without a keyframe, more temporal flickering is observed, and the edit quality diminishes as the video progresses. Combining the previous frame with an anchor frame was found to achieve a good balance.

Figure 7:
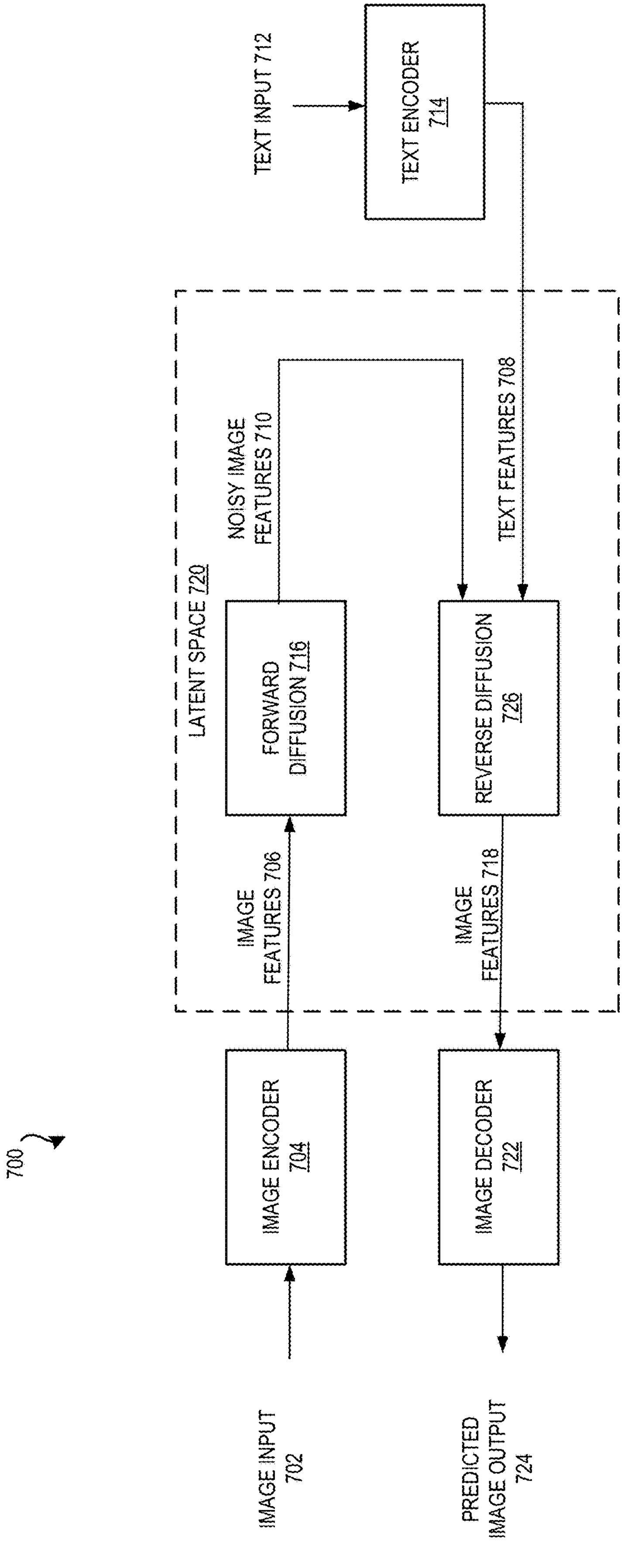
FIG. 7 illustrates an example implementation of a diffusion model, in accordance with one or more embodiments.

FIG. 7 illustrates an example implementation of a diffusion model, in accordance with one or more embodiments. As described herein, any generative AI can be executed to generate an image related to visual text using the image manager 106. In some embodiments, such generative AI is performed using a diffusion model.

A diffusion model is one example architecture used to perform generative AI. Generative AI involves predicting features for a given label. For example, given a label (or natural prompt description) "cat", the generative AI module determines the most likely features associated with a "cat." The features associated with a label are determined during training using a reverse diffusion process in which a noisy image is iteratively denoised to obtain an image. In operation, a function is determined that predicts the noise of latent space features associated with a label.

During training (e.g., using training manager for instance), an image (e.g., an image of a cat) and a corresponding label (e.g., "cat") are used to teach the diffusion model 700 features of a prompt (e.g., the label "cat"). As shown in FIG. 7, an input image 702 and a text input 712 are transformed into latent space 720 using an image encoder 704 and a text encoder 714 respectively. After the text encoder 714 and image encoder 704 have encoded text input 712 and image input 702 respectively, image features 706 and text features 708 are determined from the image input 702 and text input 712 accordingly. The latent space 720 is a space in which unobserved features are determined such that relationships and other dependencies of such features can be learned. In some embodiments, the image encoder 704 and/or text encoder 714 are pretrained. In other embodiments, the image encoder 704 and/or text encoder 714 are trained jointly.

Once image features 706 have been determined by the image encoder 704, a forward diffusion process 716 is performed according to a fixed Markov chain to inject gaussian noise into the image features 706. The forward diffusion process 716 is described in more detail with reference to FIG. 8. As a result of the forward diffusion process 716, a set of noisy image features 710 are obtained.

The text features 708 and noisy image features 710 are algorithmically combined in one or more steps (e.g., iterations) of the reverse diffusion process 726. The reverse diffusion process 726 is described in more detail with reference to FIG. 8. As a result of performing reverse diffusion, image features 718 are determined, where such image features 718 should be similar to image features 706. The image features 718 are decoded using image decoder 722 to predict image output 724. Similarity between image features 706 and 718 may be determined in any way. In some embodiments, similarity between image input 702 and predicted image output 724 is determined in any way. The similarity between image features 706 and 718 and/or images 702 and 724 are used to adjust one or more parameters of the reverse diffusion process 726.

As shown, training the diffusion model 700 is performed without a word embedding. In some embodiments, training the diffusion model 700 is performed with a word embedding. For example, the diffusion model can be fine-tuned using word embeddings. A neural network or other machine learning model may transform the text input 712 into a word embedding, where the word embedding is a representation of the text. Subsequently, the text encoder 714 receives the word embedding and the text input 712. In this manner, the text encoder 714 encodes text features 708 to include the word embedding. The word embedding provides additional information that is encoded by the text encoder 714 such that the resulting text features 708 are more useful in guiding the diffusion model to perform accurate reverse diffusion 726. In this manner, the predicted image output 724 is closer to the image input 702.

When the diffusion model is trained with word embeddings, the diffusion model can be deployed during inference to receive word embeddings. As described herein, the text received by the diffusion model during inference is a user-configurable granularity (e.g., a paragraph, a sentence, etc.) When the diffusion model receives the word embedding, the diffusion model receives a representation of the important aspects of the text. Using the word embedding in conjunction with the text, the diffusion model can create an image that is relevant/related to the text. Word embeddings determined during an upstream process (e.g., during classification of an input as a visual text) can be reused downstream (e.g., during text-to-image retrieval performed by the trained diffusion model).

Figure 8:
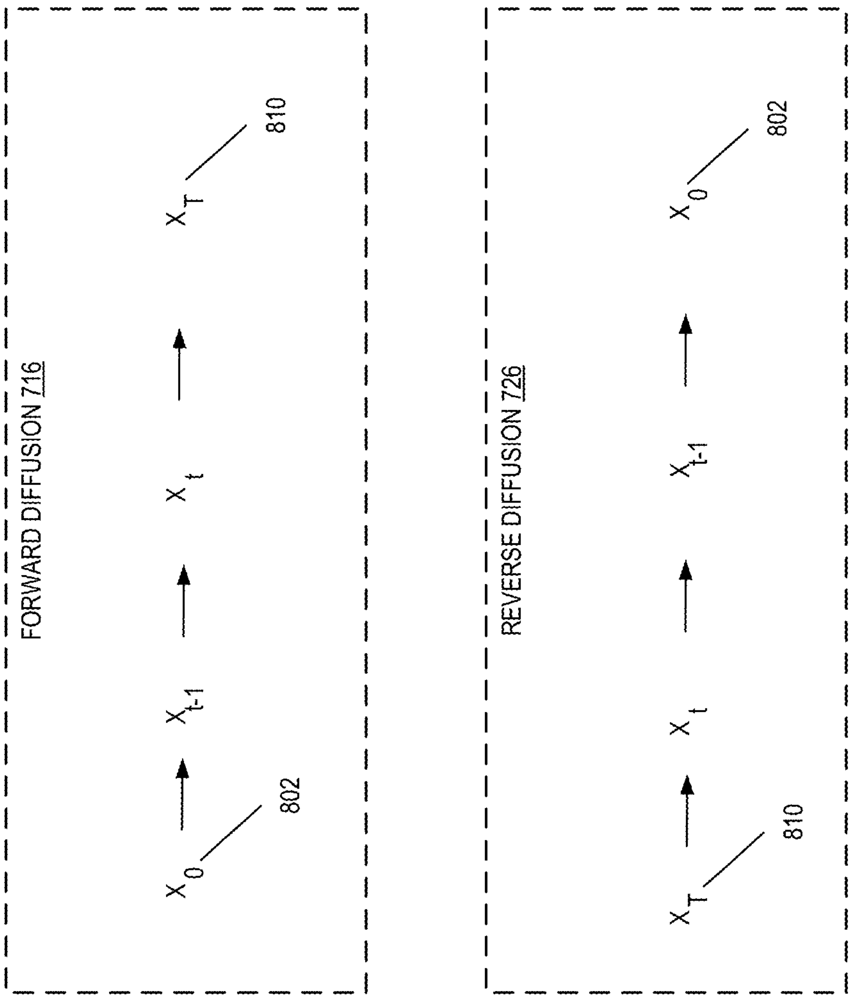
FIG. 8 illustrates the diffusion processes used to train the diffusion model, in accordance with one or more embodiments.

FIG. 8 illustrates the diffusion processes used to train the diffusion model, in accordance with one or more embodiments. The diffusion model may be implemented using any artificial intelligence/machine learning architecture in which the input dimensionality and the output dimensionality are the same. For example, the diffusion model may be implemented according to a u-net neural network architecture.

As described herein, a forward diffusion process adds noise over a series of steps (iterations t) according to a fixed Markov chain of diffusion. Subsequently, the reverse diffusion process removes noise to learn a reverse diffusion process to construct a desired image (based on the text input) from the noise. During deployment of the diffusion model, the reverse diffusion process is used in generative AI modules to generate images from input text. In some embodiments, an input image is not provided to the diffusion model.

The forward diffusion process 716 starts at an input (e.g., feature $X_0$ indicated by 802). Each time step t (or iteration) up to a number of T iterations, noise is added to the feature x such that feature $x_T$ indicated by 810 is determined. As described herein, the features that are injected with noise are latent space features. If the noise injected at each step size is small, then the denoising performed during reverse diffusion process 726 may be accurate. The noise added to the feature X can be described as a Markov chain where the distribution of noise injected at each time step depends on the previous time step. That is, the forward diffusion process 716 can be represented mathematically $$q(x_{1:T}|x_0) = \prod\nolimits_{t=1}^{T} q(x_t|x_{t-1}).$$

The reverse diffusion process 726 starts at a noisy input (e.g., noisy feature $X_T$ indicated by 810). Each time step t, noise is removed from the features. The noise removed from the features can be described as a Markov chain where the noise removed at each time step is a product of noise removed between features at two iterations and a normal Gaussian noise distribution. That is, the reverse diffusion process 826 can be represented mathematically as a joint probability of a sequence of samples in the Markov chain, where the marginal probability is multiplied by the product of conditional probabilities of the noise added at each iteration in the Markov chain. In other words, the reverse diffusion process 726 is $$p_\theta(x_{0:T}) = p(x_t)\prod\nolimits_{t=1}^{T} p_\theta(x_{t-1}|x_t),$$

where $p(x_t)=N(x_t; 0,1)$.

Figure 9:
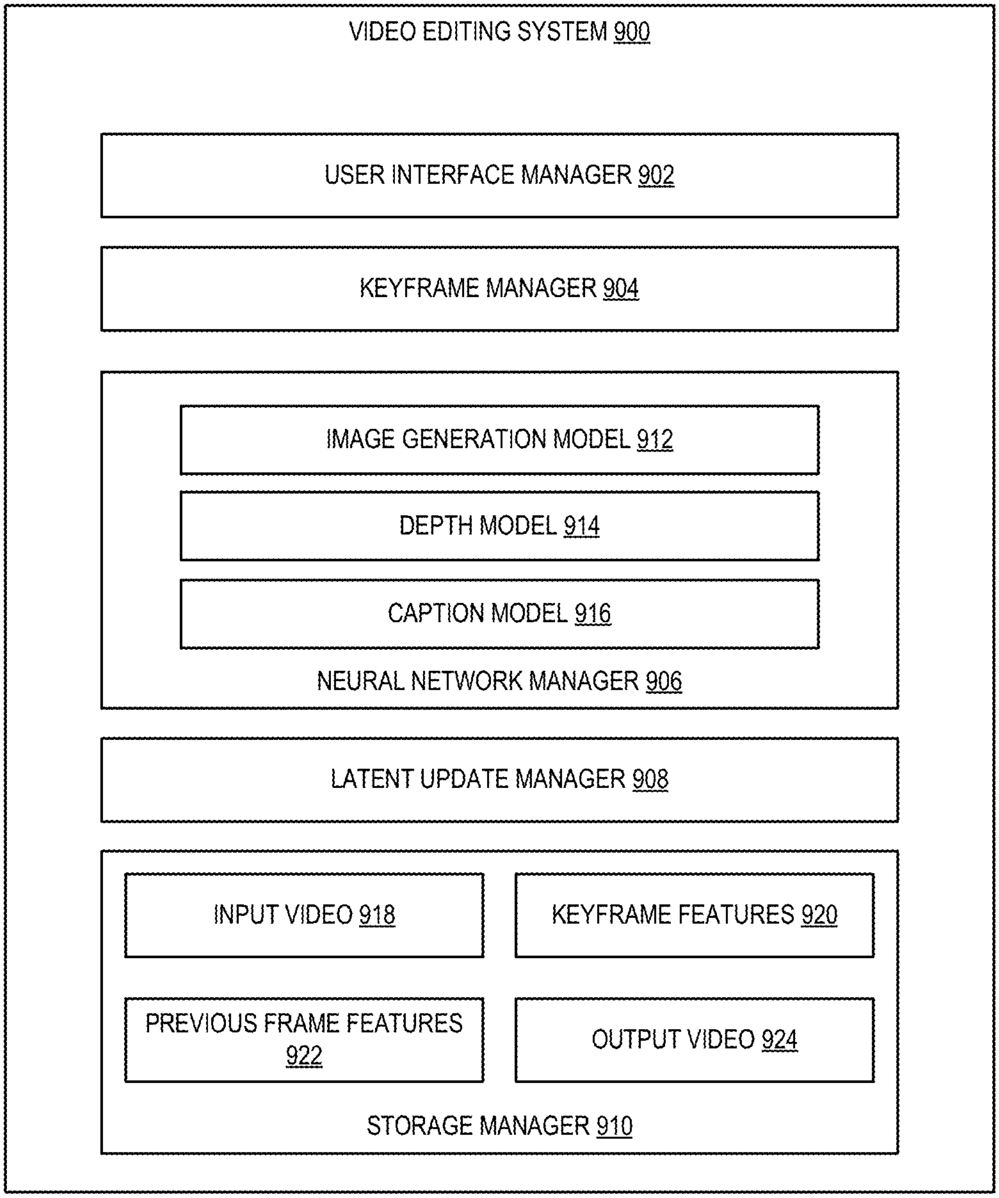
FIG. 9 illustrates a schematic diagram of a video editing system in accordance with one or more embodiments.

FIG. 9 illustrates a schematic diagram of a video editing system (e.g., "video editing system" described above) in accordance with one or more embodiments. As shown, the video editing system 900 may include, but is not limited to, user interface manager 902, keyframe manager 904, neural network manager 906, latent update manager 908, and storage manager 910. The neural network manager 908 includes image generation model 912, depth model 914, and caption model 916. The storage manager 910 includes input video 918, keyframe features 920, previous frame features 922, and output video 924.

As illustrated in FIG. 9, the video editing system 900 includes a user interface manager 902. For example, the user interface manager 902 allows users to provide input video data to the video editing system 900. In some embodiments, the user interface manager 902 provides a user interface through which the user can upload the input video 918 which is to be edited and the input text prompt that describes the edit to be made, as discussed above. Alternatively, or additionally, the user interface may enable the user to download the video from a local or remote storage location (e.g., by providing an address (e.g., a URL or other endpoint) associated with an image source). In some embodiments, the user interface can enable a user to link an image capture device, such as a camera or other hardware to capture video data and provide it to the video editing system 900.

Additionally, the user interface manager 902 allows users to request the video editing system 900 to edit the video data such as by changing (e.g., adding, removing, altering, etc.) the appearance of objects depicted in the video. For example, where the input image includes a representation of an object, the user can request that the video editing system change the color, texture, material, etc. of the object and/or the background, setting, etc., or other visual characteristics depicted in the video. In some embodiments, the user interface manager 902 enables the user to view the resulting output video and/or request further edits to the video.

As illustrated in FIG. 9, the video editing system 900 includes a keyframe manager 904. The keyframe manager 904 is responsible for determining one or more keyframes from the input video. In some embodiments, the keyframe manager may determine the first frame of the video as the keyframe. Alternatively, the first frame of the video that depicts the target of the input text prompt may be identified as the keyframe. Additionally, or alternatively, the video may include multiple scenes and a frame from each scene may be identified as a keyframe. In some embodiments, keyframes may be added at set intervals (e.g., every X frames a new keyframe is identified).

As illustrated in FIG. 9, the video editing system 900 also includes a neural network manager 906. Neural network manager 906 may host a plurality of neural networks or other machine learning models, such as image generation model 912, depth model 914, and caption model 916. The neural network manager 906 may include an execution environment, libraries, and/or any other data needed to execute the machine learning models. In some embodiments, the neural network manager 906 may be associated with dedicated software and/or hardware resources to execute the machine learning models. As discussed, image generation model 912 may be an image diffusion model, such as Stable Diffusion. In some embodiments, the image diffusion model may be depth conditioned. In such implementations, a depth model 914 can be used to predict a depth map for each frame of the input video. This depth information can be provided with the input video and used as additional structural information by the image diffusion model. Additionally, as discussed, a caption model 916 can be any model that receives an image and predicts a text caption for that image. The caption model 916 may be used during guided latent updates to determine an initial noise, as discussed. Although depicted in FIG. 9 as being hosted by a single neural network manager 906, in various embodiments the neural networks may be hosted in multiple neural network managers and/or as part of different components. For example, each model 912-916 can be hosted by their own neural network manager, or other host environment, in which the respective neural networks execute, or the networks may be spread across multiple neural network managers depending on, e.g., the resource requirements of each network, etc.

As illustrated in FIG. 9, the video editing system 900 also includes a latent update manager 908. Latent update manager 908 is responsible for performing guided latent updates based on the latent representation of a previous frame. In some embodiments, the latent representation of the immediately previous frame (e.g., I−1) is used when performing diffusion on the current frame (e.g., I). As discussed, the latent update manager 908 can perform guided diffusion on a first number of diffusion steps to improve the temporal consistency of the resulting edited video.

As illustrated in FIG. 9, the video editing system 900 also includes the storage manager 910. The storage manager 910 maintains data for the video editing system 900. The storage manager 910 can maintain data of any type, size, or kind as necessary to perform the functions of the video editing system 900. The storage manager 910, as shown in FIG. 9, includes the input video 918. The input video 918 can include a digital video to be edited based on a text prompt. The input video may be provided or identified by the user (e.g., at a storage location) and may depict one or more objects, scenes, etc. to be edited.

As further illustrated in FIG. 9, the storage manager 910 also includes keyframe features 920 and previous frame features 922. The keyframe features 920 and previous frame features 922 include features identified by the video editing system 900 when processing the keyframe and previous frame, respectively, and utilized by the video editing system 900 when processing a current frame, as discussed herein. The storage manager 910 may further include output video 924. The output video 924 is an edited digital video corresponding to the input video 918. The output video 924 has had some or all of the appearance of its depicted content edited, as discussed above. Once editing is complete, the output video 924 may be returned to the user for review.

Each of the components 902-910 of the video editing system 900 and their corresponding elements (as shown in FIG. 9) may be in communication with one another using any suitable communication technologies. It will be recognized that although components 902-910 and their corresponding elements are shown to be separate in FIG. 9, any of components 902-910 and their corresponding elements may be combined into fewer components, such as into a single facility or module, divided into more components, or configured into different components as may serve a particular embodiment.

The components 902-910 and their corresponding elements can comprise software, hardware, or both. For example, the components 902-910 and their corresponding elements can comprise one or more instructions stored on a computer-readable storage medium and executable by processors of one or more computing devices. When executed by the one or more processors, the computer-executable instructions of the video editing system 900 can cause a client device and/or a server device to perform the methods described herein. Alternatively, the components 902-910 and their corresponding elements can comprise hardware, such as a special purpose processing device to perform a certain function or group of functions. Additionally, the components 902-910 and their corresponding elements can comprise a combination of computer-executable instructions and hardware.

Furthermore, the components 902-910 of the video editing system 900 may, for example, be implemented as one or more stand-alone applications, as one or more modules of an application, as one or more plug-ins, as one or more library functions or functions that may be called by other applications, and/or as a cloud-computing model. Thus, the components 902-910 of the video editing system 900 may be implemented as a stand-alone application, such as a desktop or mobile application. Furthermore, the components 902-910 of the video editing system 900 may be implemented as one or more web-based applications hosted on a remote server. Alternatively, or additionally, the components of the video editing system 900 may be implemented in a suite of mobile device applications or "apps."

As shown, the video editing system 900 can be implemented as a single system. In other embodiments, the video editing system 900 can be implemented in whole, or in part, across multiple systems. For example, one or more functions of the video editing system 900 can be performed by one or more servers, and one or more functions of the video editing system 900 can be performed by one or more client devices. The one or more servers and/or one or more client devices may generate, store, receive, and transmit any type of data used by the video editing system 900, as described herein.

In one implementation, the one or more client devices can include or implement at least a portion of the video editing system 900. In other implementations, the one or more servers can include or implement at least a portion of the video editing system 900. For instance, the video editing system 900 can include an application running on the one or more servers or a portion of the video editing system 900 can be downloaded from the one or more servers. Additionally or alternatively, the video editing system 900 can include a web hosting application that allows the client device(s) to interact with content hosted at the one or more server(s).

The server(s) and/or client device(s) may communicate using any communication platforms and technologies suitable for transporting data and/or communication signals, including any known communication technologies, devices, media, and protocols supportive of remote data communications, examples of which will be described in more detail below with respect to FIG. 11. In some embodiments, the server(s) and/or client device(s) communicate via one or more networks. A network may include a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. The one or more networks will be discussed in more detail below with regard to FIG. 11.

The server(s) may include one or more hardware servers (e.g., hosts), each with its own computing resources (e.g., processors, memory, disk space, networking bandwidth, etc.) which may be securely divided between multiple customers (e.g. client devices), each of which may host their own applications on the server(s). The client device(s) may include one or more personal computers, laptop computers, mobile devices, mobile phones, tablets, special purpose computers, TVs, or other computing devices, including computing devices described below with regard to FIG. 11.

Figure 10:
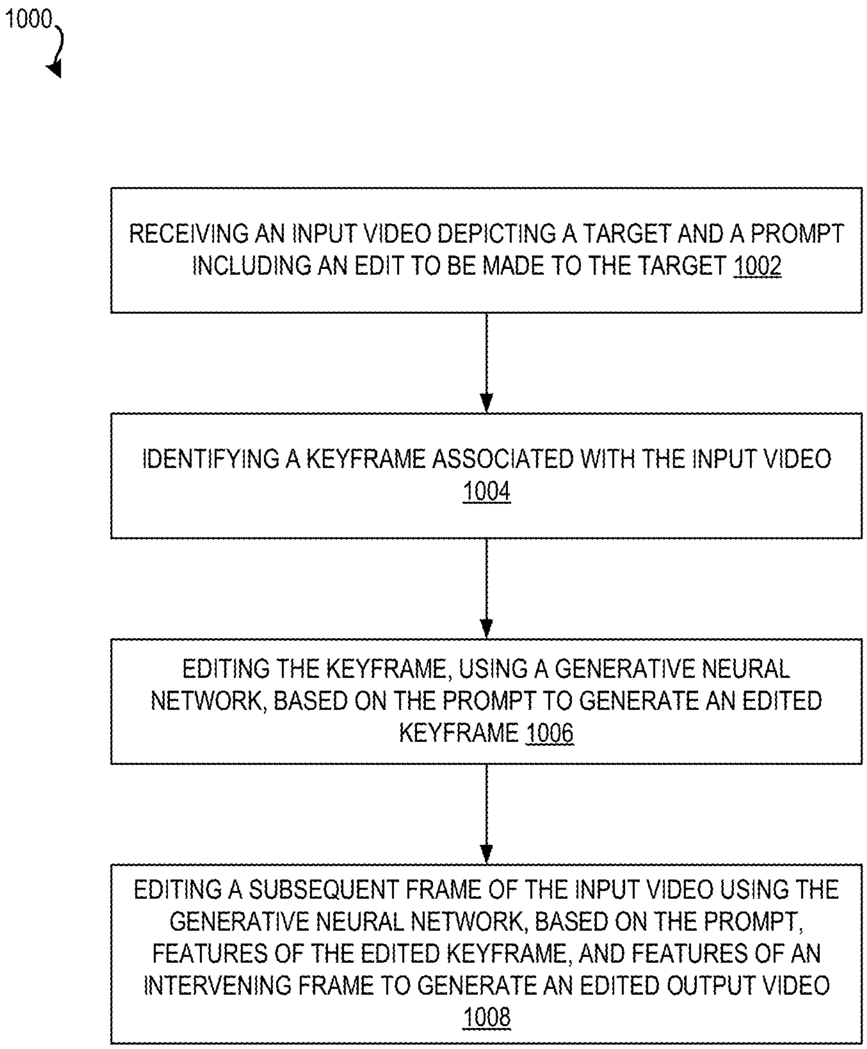
FIG. 10 illustrates a flowchart of a series of acts in a method of video editing using image diffusion in accordance with one or more embodiments.

FIGS. 1-9, the corresponding text, and the examples, provide a number of different systems and devices that enable video editing using image diffusion. In addition to the foregoing, embodiments can also be described in terms of flowcharts comprising acts and steps in a method for accomplishing a particular result. For example, FIG. 10 illustrates a flowchart of an exemplary method in accordance with one or more embodiments. The method described in relation to FIG. 10 may be performed with fewer or more steps/acts or the steps/acts may be performed in differing orders. Additionally, the steps/acts described herein may be repeated or performed in parallel with one another or in parallel with different instances of the same or similar steps/acts.

FIG. 10 illustrates a flowchart 1000 of a series of acts in a method of video editing using image diffusion in accordance with one or more embodiments. In one or more embodiments, the method 1000 is performed in a digital medium environment that includes the video editing system 900. The method 1000 is intended to be illustrative of one or more methods in accordance with the present disclosure and is not intended to limit potential embodiments. Alternative embodiments can include additional, fewer, or different steps than those articulated in FIG. 10.

As illustrated in FIG. 10, the method 1000 includes an act 1002 of receiving an input video depicting a target and a prompt including an edit to be made to the target. As discussed, the user may access a video editing system and provide a video to be edited and a text prompt describing the edits to be made. The user may upload the video, provide a link or reference to the video, stream the video from a camera or other capture device, etc.

As illustrated in FIG. 10, the method 1000 includes an act 1004 of identifying a keyframe associated with the input video. As discussed, the keyframe may be a first frame of the input video. Additionally, or alternatively, the keyframe may be a first frame of the video that depicts the target of the prompt. In some embodiments, multiple keyframes may be identified (e.g., based on video length, per scene, etc.). In some embodiments, a new keyframe is identified and a second set of frames subsequent to the new keyframe are processed using its features.

As illustrated in FIG. 10, the method 1000 includes an act 1006 of editing the keyframe, using an image generation model, based on the prompt to generate an edited keyframe. As discussed, the image generation model may include an image diffusion model, such as Stable Diffusion. In some embodiments, the image generation model includes a U-Net architecture.

As illustrated in FIG. 10, the method 1000 includes an act 1008 of editing a subsequent frame of the input video using the generative neural network, based on the prompt, features of the edited keyframe, and features of an intervening frame to generate an edited output video. An intervening frame may include a frame of the video between the keyframe, and the current frame being processed. In some embodiments, editing a subsequent frame of the input video includes injecting features from a self-attention block of the image generation model obtained from processing the keyframe into the self-attention block of the image generation model while processing the subsequent frame. Additionally, or alternatively, in some embodiments, it includes injecting features from a self-attention block of the generative neural network obtained from processing an immediately preceding frame into the self-attention block of the generative neural network while processing the subsequent frame. In some embodiments, the features are injected into the self-attention block of a decoder of the U-Net architecture. In some embodiments, the features further include depth features obtained by passing the intervening frame through a depth model, wherein the depth model is a machine learning model trained to generate a depth map for an input image.

In some embodiments, editing a subsequent frame of the input video using the image generation model further includes updating a latent space representation of the subsequent frame using a latent space representation of an immediately preceding frame for a first number of diffusion steps.

In some embodiments, a method comprises receiving a request to edit a video, the request including a digital video and a text prompt describing the edit, generating an edited video using an image diffusion model, wherein feature injection is used for appearance consistency and guided latent updates are used for temporal consistency, and returning the edited video.

In some embodiments, generating an edited video using an image diffusion model, further includes identifying a keyframe associated with the input video, editing the keyframe, using the image diffusion model, based on the prompt to generate an edited keyframe, and editing subsequent frames of the input video using the image diffusion model, based on the prompt, features of the edited keyframe, and features of intervening frames to generate the edited video.

In some embodiments, editing the subsequent frames of the input video using the image diffusion model includes injecting features from a self-attention block of a decoder of a U-Net architecture of the generative neural network obtained from processing the keyframe into the self-attention block of the generative neural network while processing the subsequent frame. In some embodiments, editing the subsequent frames of the input video using using the image diffusion model, based on the prompt, features of the edited keyframe, and features of intervening frames to generate the edited video, further comprises: updating a latent space representation of the subsequent frame using a latent space representation of an immediately preceding frame for a first number of diffusion steps.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other non-transitory storage medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 11:
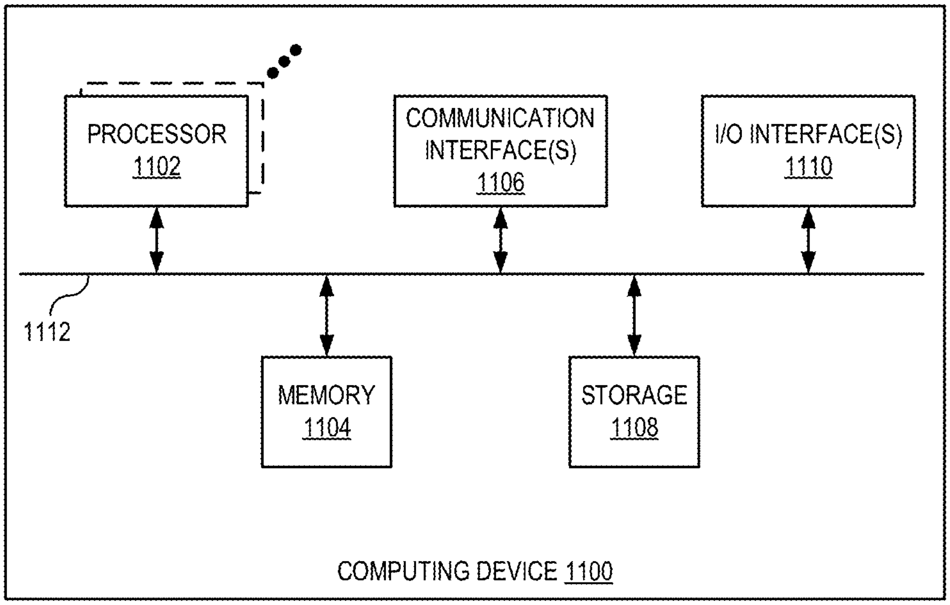
FIG. 11 illustrates a block diagram of an exemplary computing device in accordance with one or more embodiments.

FIG. 11 illustrates, in block diagram form, an exemplary computing device 1100 that may be configured to perform one or more of the processes described above. One will appreciate that one or more computing devices such as the computing device 1100 may implement the video editing system. As shown by FIG. 11, the computing device can comprise a processor 1102, memory 1104, one or more communication interfaces 1106, a storage device 1108, and one or more I/O devices/interfaces 1110. In certain embodiments, the computing device 1100 can include fewer or more components than those shown in FIG. 11. Components of computing device 1100 shown in FIG. 11 will now be described in additional detail.

In particular embodiments, processor(s) 1102 includes hardware for executing instructions, such as those making up a computer program. As an example, and not by way of limitation, to execute instructions, processor(s) 1102 may retrieve (or fetch) the instructions from an internal register, an internal cache, memory 1104, or a storage device 1108 and decode and execute them. In various embodiments, the processor(s) 1102 may include one or more central processing units (CPUs), graphics processing units (GPUs), field programmable gate arrays (FPGAs), systems on chip (SoC), or other processor(s) or combinations of processors.

The computing device 1100 includes memory 1104, which is coupled to the processor(s) 1102. The memory 1104 may be used for storing data, metadata, and programs for execution by the processor(s). The memory 1104 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1104 may be internal or distributed memory.

The computing device 1100 can further include one or more communication interfaces 1106. A communication interface 1106 can include hardware, software, or both. The communication interface 1106 can provide one or more interfaces for communication (such as, for example, packet-based communication) between the computing device and one or more other computing devices 1100 or one or more networks. As an example and not by way of limitation, communication interface 1106 may include a network interface controller (NIC) or network adapter for communicating with an Ethernet or other wire-based network or a wireless NIC (WNIC) or wireless adapter for communicating with a wireless network, such as a WI-FI. The computing device 1100 can further include a bus 1112. The bus 1112 can comprise hardware, software, or both that couples components of computing device 1100 to each other.

The computing device 1100 includes a storage device 1108 includes storage for storing data or instructions. As an example, and not by way of limitation, storage device 1108 can comprise a non-transitory storage medium described above. The storage device 1108 may include a hard disk drive (HDD), flash memory, a Universal Serial Bus (USB) drive or a combination these or other storage devices. The computing device 1100 also includes one or more input or output ("I/O") devices/interfaces 1110, which are provided to allow a user to provide input to (such as user strokes), receive output from, and otherwise transfer data to and from the computing device 1100. These I/O devices/interfaces 1110 may include a mouse, keypad or a keyboard, a touch screen, camera, optical scanner, network interface, modem, other known I/O devices or a combination of such I/O devices/interfaces 1110. The touch screen may be activated with a stylus or a finger.

The I/O devices/interfaces 1110 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1110 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A method comprising:
receiving an input video depicting a target and a prompt including an edit to be made to the target;
identifying a frame of the input video as a keyframe;
editing the keyframe, using an image generation model, based on the prompt to generate an edited keyframe; and
editing subsequent frames of the input video using the image generation model, based on the prompt, features of the edited keyframe, and features of an intervening frame to generate an edited output video.

2. The method of claim 1, wherein the image generation model includes a U-Net architecture.

3. The method of claim 2, wherein editing the subsequent frames of the input video using the image generation model, based on the prompt, features of the edited keyframe, and features of an intervening frame to generate an edited output video, further comprises:
injecting features from a self-attention block of the image generation model obtained from processing the keyframe into the self-attention block of the image generation model while processing the subsequent frames.

4. The method of claim 3, wherein editing the subsequent frames of the input video using the image generation model, based on the prompt, features of the edited keyframe, and features of an intervening frame to generate an edited output video, further comprises:
injecting features from a self-attention block of the image generation model obtained from processing an immediately preceding frame into the self-attention block of the image generation model while processing the subsequent frames.

5. The method of claim 3, wherein the features are injected into the self-attention block of a decoder of the U-Net architecture.

6. The method of claim 3, wherein the features further include depth features obtained by passing the intervening frame through a depth model, wherein the depth model is a machine learning model trained to generate a depth map for an input image.

7. The method of claim 1, wherein editing the subsequent frames of the input video using the image generation model, based on the prompt, features of the edited keyframe, and features of an intervening frame to generate an edited output video, further comprises:
updating a latent space representation of the subsequent frames using a latent space representation of an immediately preceding frame for a first number of diffusion steps.

8. The method of claim 1, further comprising:
identifying a new keyframe and processing a second set of frames subsequent to the new keyframe using features associated with the new keyframe.

9. A non-transitory computer-readable medium storing executable instructions, which when executed by a processing device, cause the processing device to perform operations comprising:
receiving an input video depicting a target and a prompt including an edit to be made to the target;
identifying a frame of the input video as a keyframe;
editing the keyframe, using an image generation model, based on the prompt to generate an edited keyframe; and
editing subsequent frames of the input video using the image generation model, based on the prompt, features of the edited keyframe, and features of an intervening frame to generate an edited output video.

10. The non-transitory computer-readable medium of claim 9, wherein the image generation model includes a U-Net architecture.

11. The non-transitory computer-readable medium of claim 10, wherein the operation of editing the subsequent frames of the input video using the image generation model, based on the prompt, features of the edited keyframe, and features of an intervening frame to generate an edited output video, further comprises:
injecting features from a self-attention block of the image generation model obtained from processing the keyframe into the self-attention block of the image generation model while processing the subsequent frames.

12. The non-transitory computer-readable medium of claim 11, wherein the operation of editing the subsequent frames of the input video using the image generation model, based on the prompt, features of the edited keyframe, and features of an intervening frame to generate an edited output video, further comprises:
injecting features from a self-attention block of the image generation model obtained from processing an immediately preceding frame into the self-attention block of the image generation model while processing the subsequent frames.

13. The non-transitory computer-readable medium of claim 11, wherein the features are injected into the self-attention block of a decoder of the U-Net architecture.

14. The non-transitory computer-readable medium of claim 11, wherein the features further include depth features obtained by passing the intervening frame through a depth model, wherein the depth model is a machine learning model trained to generate a depth map for an input image.

15. The non-transitory computer-readable medium of claim 9, wherein the operation of editing the subsequent frames of the input video using the image generation model, based on the prompt, features of the edited keyframe, and features of an intervening frame to generate an edited output video, further comprises:
updating a latent space representation of the subsequent frames using a latent space representation of an immediately preceding frame for a first number of diffusion steps.

16. The non-transitory computer-readable medium of claim 9, further comprising:
identifying a new keyframe and processing a second set of frames subsequent to the new keyframe using features associated with the new keyframe.

17. A system comprising:
a memory component; and
a processing device coupled to the memory component, the processing device to perform operations comprising:
receiving a request to edit a video, the request including the video and a text prompt describing the edit;
generating an edited video using an image diffusion model, wherein feature injection of features from at least a keyframe of the video is used for appearance consistency of subsequent frames of the video and guided latent updates are used for temporal consistency; and returning the edited video.

18. The system of claim 17, wherein the operation of generating an edited video using an image diffusion model further comprises:

identifying a frame of the video as the keyframe;

editing the keyframe, using the image diffusion model, based on the text prompt to generate an edited keyframe; and editing the subsequent frames of the video using the image diffusion model, based on the prompt, features of the edited keyframe, and features of intervening frames to generate the edited video.

19. The system of claim 18, wherein the operation of editing subsequent frames of the video using the image diffusion model, based on the prompt, features of the edited keyframe, and features of intervening frames to generate the edited video, further comprises:

injecting features from a self-attention block of a decoder of a U-Net architecture of the image diffusion model obtained from processing the keyframe into the self-attention block of the image diffusion model while processing the subsequent frames.

20. The system of claim 18, wherein the operation of editing subsequent frames of the video using the image diffusion model, based on the prompt, features of the edited keyframe, and features of intervening frames to generate the edited video, further comprises:

updating a latent space representation of the subsequent frames using a latent space representation of an immediately preceding frame for a first number of diffusion steps.

* * * * *